US007614131B2

(12) United States Patent
Leverett

(10) Patent No.: US 7,614,131 B2
(45) Date of Patent: Nov. 10, 2009

(54) METHOD FOR MAKING A MODULAR CASKET ASSEMBLY

(76) Inventor: B. Calvin Leverett, P.O. Box 558, Amory, MS (US) 38821

( * ) Notice: Subject to any disclaimer, the term of this patent is extended or adjusted under 35 U.S.C. 154(b) by 355 days.

(21) Appl. No.: 11/807,126

(22) Filed: May 25, 2007

(65) Prior Publication Data

US 2007/0226969 A1 Oct. 4, 2007

Related U.S. Application Data

(62) Division of application No. 10/678,578, filed on Oct. 3, 2003, now Pat. No. 7,222,400.

(51) Int. Cl.
*B23P 25/00* (2006.01)
*A61G 17/007* (2006.01)

(52) U.S. Cl. .................... 29/458; 29/525.13; 29/527.1; 27/2; 27/3

(58) Field of Classification Search .................. 29/458, 29/525.13, 525.15, 527.1; 27/2, 3, 5, 19; 144/332; 428/541, 304.4
See application file for complete search history.

(56) References Cited

U.S. PATENT DOCUMENTS

| | | | |
|---|---|---|---|
| 246,241 | A | 8/1881 | Taylor |
| 1,373,730 | A | 4/1921 | Hollins |
| 1,388,426 | A | 8/1921 | Greive |
| 1,610,781 | A | 12/1926 | Hollins |
| 1,733,629 | A | 10/1929 | Schleicher |
| 1,848,417 | A | 3/1932 | Evel |
| 2,031,275 | A | 2/1936 | McLaurin |
| 2,231,995 | A | 2/1941 | Glidden et al. |
| 2,249,283 | A | 7/1941 | Brady et al. |
| 2,788,597 | A | 4/1957 | Michel |
| 2,835,014 | A | 5/1958 | Dioguardi, Jr. |
| 3,115,434 | A | 12/1963 | Hahn |
| 3,157,936 | A | 11/1964 | Hillenbrand |
| 3,735,457 | A | 5/1973 | Esterdahl |
| 3,962,761 | A | 6/1976 | Boughner |
| 4,137,613 | A | 2/1979 | Ceresko |
| 4,357,741 | A | 11/1982 | Winburn et al. |
| 4,571,791 | A | 2/1986 | Ceresko |
| 4,730,370 | A | 3/1988 | Elder |

(Continued)

FOREIGN PATENT DOCUMENTS

JP 60096404 A * 5/1985

*Primary Examiner*—Jermie E Cozart
(74) *Attorney, Agent, or Firm*—Jackson Walker L.L.P.

(57) ABSTRACT

A modular casket assembly, created from composite wood scraps ground to a fine wooden composite grind and dried, is provided. A fine wooden composite is mixed with a dry glue and heat or pressure activated as desired. This mixture is then placed in a press mold with a thin veneer cover. The veneer cover may be paper, wood, cloth or other material. Typically, the veneer is perforated with small pin holes to permit steam to pass through during compression. Any desired image or scene may be provided on the veneer. The mold mixture and veneer is then compressed in a wood press, and to provide a finished product with durable veneer with a finished surface. The finished surface can be a fine wood finish, a wood-look finish or any variety of customized images. The casket assembly includes substantially flat or curvilinear panels. The casket assembly may be split as desired. Decorative brackets may be used to assemble the casket box.

20 Claims, 3 Drawing Sheets

U.S. PATENT DOCUMENTS

| | | | | |
|---|---|---|---|---|
| 5,007,148 | A | 4/1991 | Bida | |
| 5,404,627 | A | 4/1995 | Shepherd | |
| 5,439,749 | A | 8/1995 | Klasell et al. | |
| 5,709,016 | A | 1/1998 | Gulick et al. | |
| 5,887,321 | A | 3/1999 | Foley, Jr. | |
| 5,900,304 | A * | 5/1999 | Owens | 428/182 |
| 5,985,399 | A | 11/1999 | Tambussi | |
| 6,018,853 | A | 2/2000 | Chen et al. | |
| 6,223,404 | B1 | 5/2001 | Fant et al. | |
| 6,451,235 | B1 * | 9/2002 | Owens | 264/86 |
| 6,497,018 | B1 | 12/2002 | Chiu et al. | |
| 2002/0180206 | A1 | 12/2002 | Tronrud | |

* cited by examiner

METHOD FOR MAKING A MODULAR CASKET ASSEMBLY

CROSS-REFERENCE TO RELATED APPLICATIONS

The present application is a divisional of and claims priority to U.S. patent application Ser. No. 10/678,578, filed Oct. 3, 2003, entitled "Modular Casket System," now U.S. Pat. No. 7,222,400 B2, the entirety of which is hereby incorporated by reference.

BACKGROUND

The subject invention is generally related to casket systems and is specifically directed to a modular casket assembly made of composite materials that may be shipped flat and assembled at a location remote from the point of manufacture.

Caskets are a symbol of death and remind people of their own mortality. For this reason, the sight or thought of a casket can often times be disturbing. Although, caskets are not necessarily a desirable discussion topic, caskets are a necessary and common part of the process of disposing of human remains. However, the fact still remains that the sight of a casket can have a depressing effect on the persons viewing a casket. Thus, there is a need to soften the visual effect of caskets to alleviate the angst of those who may be viewing such caskets.

For many years, people have tried to diminish the visual effects of caskets. Many efforts to soften the visual effects of a casket have focused on the interior of the casket and the position of the body in the casket. Previously, others have attempted this by creating devices to draw attention to the deceased and away from the casket's appearance. Therefore, improvements in the field of casket making have centered on providing a casket which presents the body in a restful or peaceful position for viewing by mourners.

Still other efforts to diminish the impact of a casket's appearance have focused on changing the external form of the casket. U.S. Pat. No. 5,404,627 issued to Shepherd teaches a casket arranged in a manner to imitate a bed upon which the body displayed therein is made to appear sleeping restfully.

In the past, it has not been practical to prepare a custom design that could reduce the visual effects of the casket. As a result, choices for burial industry customers have been limited to standard finishes for commercially available caskets. Little or no innovation in casket style and design has surfaced in the industry over the last several decades. Most changes have focused on providing an increase in the variety of available casket colors. There has been no practical means to truly personalize a casket to reveal some insight into the personality of the deceased person.

Although there has been little change in casket design for some time, there is a growing desire for customized caskets. The funeral/casket industry is under increased pressure to provide options for price-sensitive buyers without sacrificing incremental margin. In addition, the funeral/casket industry has targeted pre-need purchases as a growth area. To accommodate the desires of these purchasers, the industry will need to provide custom designed caskets.

Basic casket technology has changed little over the years. Originally, the exterior box of the casket was made of wood, with a wood lid. The interior would then be finished in any of a variety of styles, from plain to cushioned silk linings. Some caskets have hinged lids, either split or single, while others, generally referred to as coffins, have unattached lids. Such caskets are manufactured and assembled in much the same manner as furniture, whether rough "cabin" grade or fine finished furniture.

More recently, steel or other metal caskets have come into relatively widespread use. These can be either highly polished finished metal surfaces, covered surfaces, often with cloth, or more recently and as described in U.S. Pat. No. 6,223,404, issued to Fant, an image is applied directly to the exterior of the surface to provide a custom casket unique to individual tastes.

As shown and described in the Fant patent, a digitally imaged, adhesive-backed substrate is permanently affixed to the exterior surface to provide imagery is specifically selected to provide a glimpse into the nature and personality of the life of the deceased. A moisture resistant substrate renders the finish highly resistant to the effects of adverse ambient conditions. This is accomplished through a process that involves generating an image and affixing the image to the casket's external surface. The desired design is applied to a substrate material which is subsequently affixed to the casket surface. In affixing the substrate material to the casket surface, the substrate material is first printed with an image and is then cut into panels that correspond to the external sections of the casket. Each panel of the substrate material displays a portion of the custom design (similar to the way each piece of a puzzle displays a part of the puzzle picture). The back of the substrate material is coated with an adhesive to permanently affix the substrate to the casket. The substrate can be moved and repositioned on the casket to permit accurate alignment prior to actual bonding. Once properly positioned the bonding is completed by applying light pressure to the substrate. Once applied, a blunt or rounded application tool is used to press the adjoining edges in place, much in the same manner as abutting seams of wallpaper are smoothed.

While all of these improvements change the exterior appearance of the casket, none of them address basic method of manufacture. Wood caskets are made and assembled in a factory and shipped as completed units. Likewise, metal caskets are welded or otherwise assembled in a factory and shipped as completed units. While exterior finishes can be applied at a different location, as well as the finished interior, the cost of shipping completed units is still a major component in the casket price. This is particularly true when overseas shipping is involved. For this reason, casket making is primarily a domestic industry. Basically, because of shipping costs alone, it is not practical to manufacture caskets in non-domestic factories where labor and material costs may be beneficial to both the manufacturer and the consumer.

SUMMARY

The subject invention is directed to a modular casket assembly that takes advantage of reduced shipping costs whether made domestically or in non-domestic factories, with favorable material costs and with the same flexibility as the newer casket designs permitting personalized or customized caskets.

The exterior casket box is created from composite wood scraps which are ground to a fine wooden composite grind and dried. These are then mixed with a dry glue which is heat or pressure activated. This mixture is then placed in a press mold with thin veneer cover. The veneer cover may be paper, wood or cloth. Typically the veneer is perforated with small pin holes to permit steam to pass through during compression. Any desired image or scene may be provided on the veneer. For example, the veneer may be a thin layer of fine wood such as mahogany, may be a wood print on paper or cloth or may be a pectoral scene such as that described in the aforementioned Fant patent.

The mold mixture and veneer is the compressed in wood press. In the preferred embodiment, the press is approximately 300 tons. This pressure, and the resultant heat created by the pressure and friction, activates the glue to bind the wood composite into a solid unit and to bind the veneer to the composite. The finished product is a durable veneer with a finished surface. The finished surface can be a fine wood finish, a wood-look finish or any of wide variety of customized images.

The casket assembly includes substantially flat or curvilinear side wall panels, a substantially flat bottom panel, and substantially flat end wall panels for defining an open box. The top or lid may be a flat or curved panel, in the standard and customary shapes, and may be a single unit or split as desired. Decorative brackets are used to assemble the casket box. These may be of the same material and finish as the box panels or may be of a contrasting material such as brass or bronze, for example. The assembled casket box may then have an interior finish applied in the customary manner.

The final assembly is aesthetically pleasing and resembles caskets manufactured in the tradition of fine furniture at a fraction of the cost. In addition, the casket assembly components may be shipped anywhere in the world as a flat assembly, greatly reducing shipping costs.

The panels are positioned and fastened together in a finished assembly at the location where the interior finishing is applied. Typically the assembly pieces are bolted together via the brackets, but other fastening means such as glue may be used in conjunction with or independently of the brackets. The panels are completely finished at the factory and no finishing work is required at the point of assembly.

The finished casket is an attractive alternative to the costly caskets manufactured by historical methods.

It is, therefore, an object and feature of the invention to provide a modular casket assembly permitting flat shipping.

It is also an object and feature of the subject invention to provide a low cost alternative to costly wood caskets without sacrificing any aesthetics.

It is a further object and feature of the subject invention to provide a casket assembly made from composite materials and suitable veneers.

Other objects and features of the invention will be readily apparent from the accompanying drawings and description of the preferred embodiment.

DETAILED DESCRIPTION OF PREFERRED EMBODIMENTS

The subject invention is a method for making a modular casket assembly, comprising the steps of mixing a composite base material with a binder compressing the mixture into a plurality of molded panels defining a casket box, applying a veneer to the outer surfaces of the panels, and thereafter assembling the panels into a casket box. The binder may be a hot melt glue or similar binder. In the preferred embodiment, the base material is a wood grind, preferably hardwood. Desirable results are achieved when the wood particles are ground into a fine sawdust.

The veneer may be a thin wood veneer, preferably hardwood. Other materials may also be use, including but not limited to: a soft material such as cloth or plastic sheeting or leather. A metal foil may also be used to create a casket with a metal exterior.

The casket assembly comprises pre-shaped panels from the mold, including a pair of substantially flat end panels, a pair of substantially flat side panels each adapted to mate with the pair of end panels, a bottom panel adapted to mate with the side panels and the end panels to define with the side panels and end panels an open box, and a lid panel adapted to cover the open box. In the preferred embodiment the lid panel is hinged to one of said side panels along one edge. The panels are secured together, typically with decorative brackets for securing the side, end and bottom panels in assembled relationship.

Figure 1:
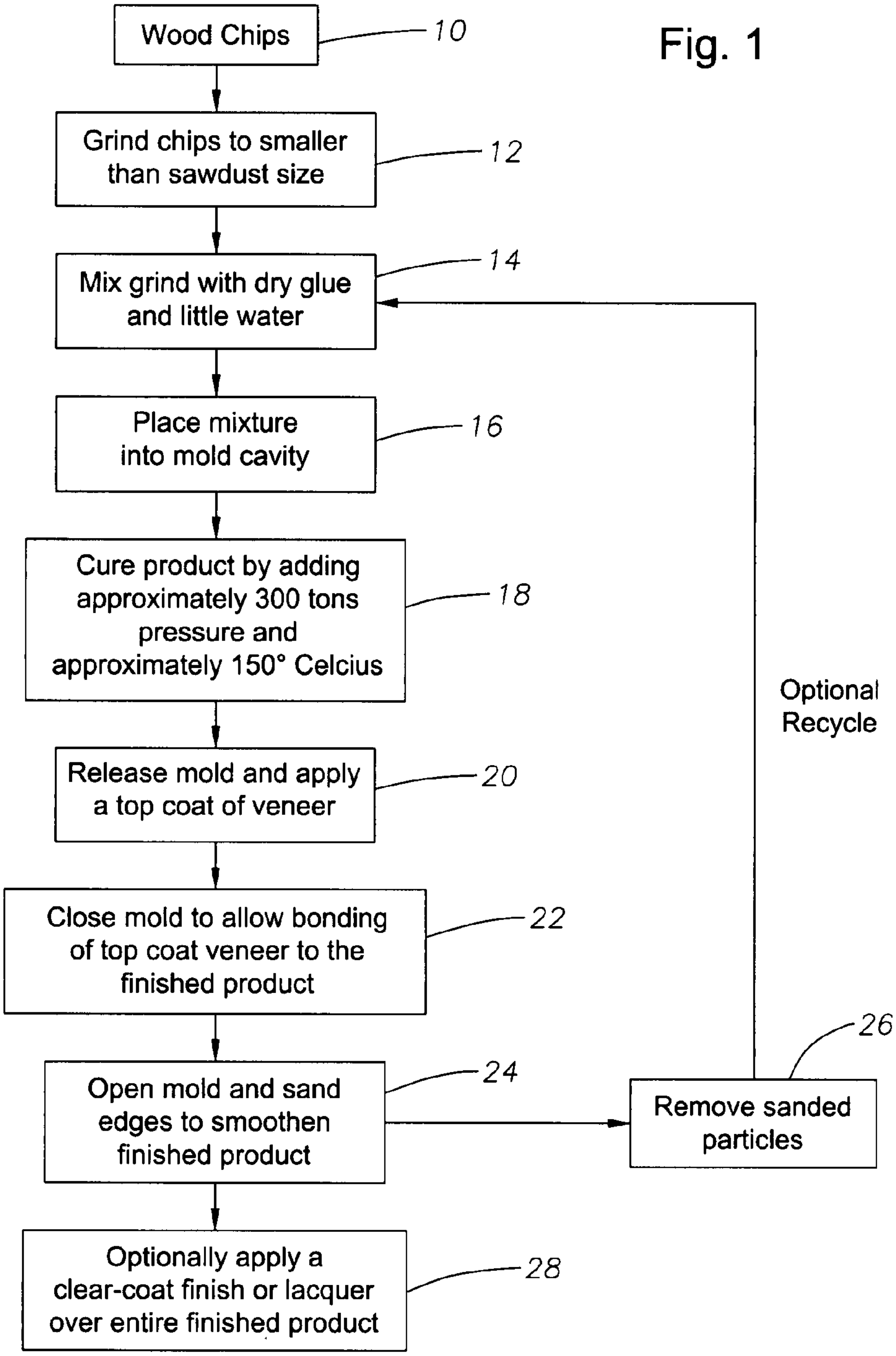
FIG. 1 is a block diagram of the manufacturing method for making the components of the casket assembly.

FIG. 1 shows the process used to manufacture the component pieces of a casket which can later be assembled with the use of brackets or hinges at the location where the interior finishing is applied. This process will allow a more cost effective way to ship the casket components as a flat assembly rather than the entire assembled casket. The first step is to prepare the composites. First, a supply of wood chips 10 is provided, which may be collected from furniture factories or other factories that use hardwoods for producing goods. The wood chips are passed through a grinding machine 12 to obtain fine wooden composite grind which is smaller than the size of sawdust. The grind is then packed into storage bags and placed in a drying kiln for approximately two to three days. These storage bags are stacked in layers and are separated by bamboo poles or the like to increase air circulation. The heat used for drying the kiln can be from electricity, the burning of oil, a steam boiler, or other heat sources. In the preferred embodiment of the invention a steam boiler is used in which waste wood from production is burned to power the steam boiler. Thus, this process is environmentally friendly and easy to maintain. At the end of this drying period, the moisture content of the composite is reduced to six to eight percent. The storage bags are then transferred to a storage room where they then await to be further processed. The next step 14 in the process is to mix the stored grind with dry glue, and where desired a small amount of water. This mixture is then poured into a cavity which has been formed by the clamping together of a mold in a press machine as shown at 16.

The preferred embodiment utilizes 4-Up vertical press machines which are fully-automated and is powered by steam channeled from the steam boiler. At this time, the mixture is approximately five times the thickness of the finished product. The mold is then closed and placed under about 300 tons pressure and also heated to about 150 degrees Celsius so that the mixture can be cured, see step 18. The mold undergoes this variable pressure and heat for approximately six to eight minutes. Once the curing cycle is completed, the mold is released and the finished top coat of veneer is ready to be applied to the resulting compressed wood, see step 20. The veneer paper preparation occurs at the same time as when the mixture undergoes pressure and heating. The veneer can be made of wood, paper, fabric, leather, or other materials. The preferred embodiment uses a sheet of paper with small holes in it, up to 500 holes, to prepare the veneer.

The paper is prepared by passing it through a machine which applies glue onto the paper. The wet paper next passes through a conveyor belt which allows the paper wetness to be reduced. The paper is then placed on veneer sheets and later brought to the press machines. The prepared veneer is placed on the compressed wood while the compressed wood is still in the mold and very hot. A jig is used to hold the composite mixture with the veneer sheet on top. Before the glue on the veneer sets, the mold is closed for an additional two to three minutes so that the top coat of veneer will bond to the finished product, see step 22. The bonding occurs by the pressurizing and the passing of steam through the bottom of the composite mixture to the top where the veneer sheet has been placed. The pressure and the heat activates the glue to bind the wood composite into a solid unit and to bind the veneer to the composite wood. The holes in the paper allow the steam to pass and activate the glue on the paper. At this stage, a semi-finished product has been made and is now ready for the final stages. These final stages involve sanding the edges to smoothen the product and applying a clear-coat finish or lacquer depending on the customer's requirements, as indicated at 24.

The process may include another environmentally-friendly step 26 in which the resulting sanded materials are recycled back into the process at the stage where the grind mixture is created. The finished product is a durable veneer with a finished surface. Optionally, the finished surface can be a fine wood finish, a wood-look finish or any of a wide variety of customized images, as shown at 28.

Figure 2:
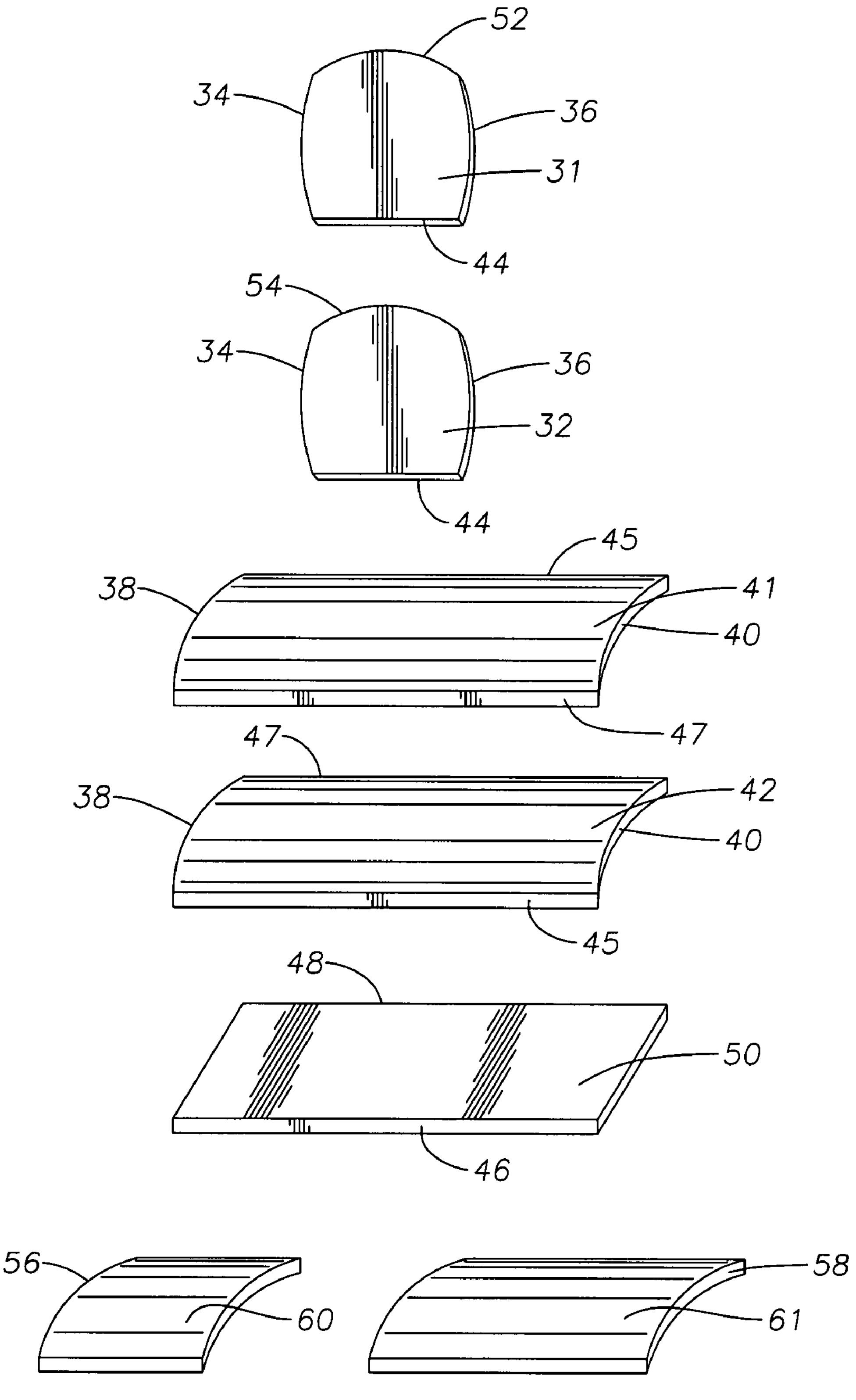
FIG. 2 shows the basic unassembled components of a typical casket assembly.

FIG. 2 depicts the finished, unassembled modular product which consists of all sides of the casket which can be now be shipped more economically. The top two panels 31, 32 represent the front and rear end wall panels of a casket. The two end wall panels are substantially flat with edges 34, 36 that are designed to mate with the curved edges 38, 40 of the two side wall panels 41, 42. The bottom edge 44 of the two end wall panels is design to meet with the generally straight side edges 46, 48 of the bottom panel 50. The top edges 52, 54 of the two end wall panels are curved to mate with the left and right curved end edges 56, 58 of the curved lid assembly comprising panels 60, 61.

The side wall panels 41, 42 run the length of the casket. The side wall panels are substantially flat, but may be curved, as shown, for aesthetic purposes. The end edges 38, 40 are designed to mate with the two end wall panels 31, 32. The bottom edge 45 of each side wall panel is design to meet with the bottom 50. The top edge 47 of each side wall panel is designed to mate with the outer edges of the lid panel(s) 60, 61.

The bottom panel 50 runs the length of the casket assembly and is substantially flat.

The lid panel(s) 60, 61 may be flat or curved (as shown) and may be a single unit or a split unit (as shown), depending on preference. The side edges of the lip panels are designed to mate with the top edge of the two end wall panels 31,32 The outer edges of the lid panels are designed to mate with the top edge of the two side wall panels and may be hinged thereto along one side.

Figure 3:
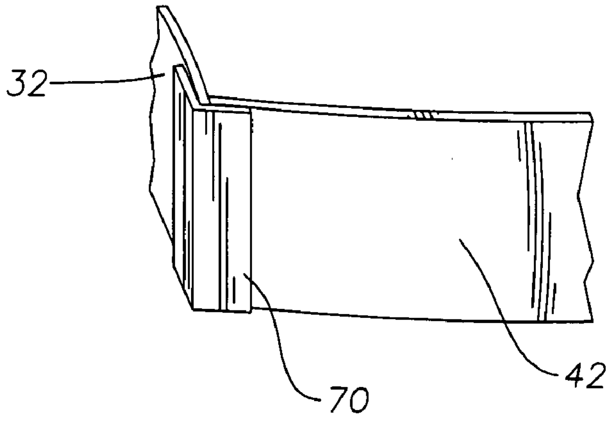
FIG. 3 shows an assembly bracket fragment.

FIG. 3 depicts a bracket 70 which can be used to attach each side of a panel to a side of another panel. The figure shows the right side of the front end wall panel 32 attached to the left side of a side wall panel 42 by use of a bracket. The preferred embodiment uses a bracket, but other alternative means of attaching the two sides may be used. For example, a hinge or a type of glue can also be used. Also, any combination of these attaching means may be utilized. The brackets can be made of a variety of materials including, but not limited to, the same material as the box panels, or other contrasting materials such as brass or bronze.

Figure 4:
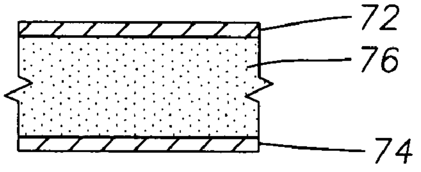
FIG. 4 is a cross-section of one of the panel components of the casket assembly.

FIG. 4 shows an enlarged pictorial of the composite wood. The top and bottom layers 72, 74 represent the veneer and the middle layer represents the grind 76 which has been cured by applying pressure, steam and glue to it. A plurality of pin holes is shown in veneer layers 72 and 74.

Figure 5:
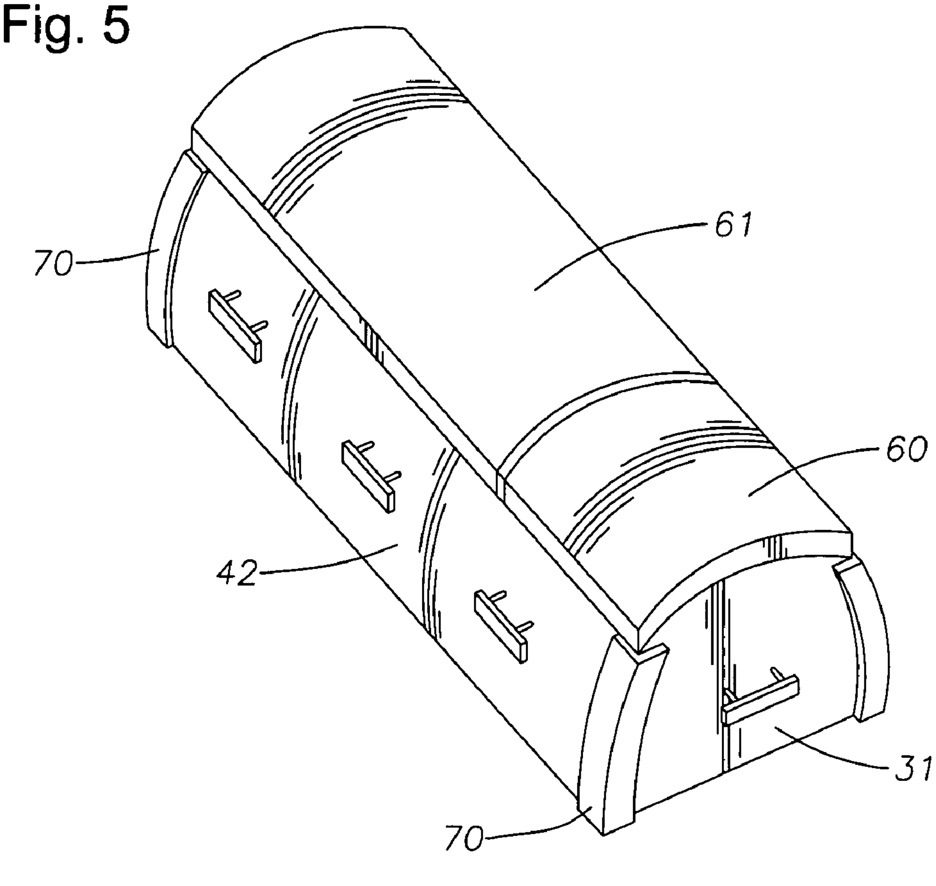
FIG. 5 shows a typical final assembly.

FIG. 5 depicts an assembled casket which utilizes the final product. The casket shows one of the two end wall panels, one of the two side wall panels, and the top panel. The other panels are attached, but cannot be viewed in this depiction. The brackets are also shown here connecting the panels to each other.

The final casket assembly is aesthetically pleasing and resembles caskets manufactured in the tradition of fine furniture at a fraction of the cost. In addition, the casket assembly components may be shipped anywhere in the world as a flat assembly, thus greatly reducing the shipping costs. The panels are positioned and fastened together in a finished assembly at the location where the interior finishing is applied. The panels are completely finished at the factory and no finishing work is required at the point of assembly. These finished caskets are an attractive alternative to the costly caskets manufactured by historical methods.

What is claimed is:

1. A method for making a modular casket assembly, comprising the steps of:

a. mixing a composite base material with a binder to form a mixture;

b. compressing the mixture into a plurality of molded panels defining a casket box;

c. providing a veneer perforated with a plurality of pinholes;

d. applying a binder to at least a veneer surface or a panel surface;

e. applying the veneer to a plurality of the panels;

f. causing steam to pass through the pinholes to activate the glue applied to a surface so as to cause the veneer to be secured to the panels;

g. following the step of securing the veneer to the panel, assembling the molded panels into a casket; and h. applying a finish coat to the veneer secured to at least one panel.

2. The method of claim 1 wherein the binder is a hot melt glue.

3. The method of claim 1 wherein the base material is wood particles.

4. The method of claim 3 wherein the base material is hardwood particles.

5. The method of claim 3 further including the step of grinding the wood particles into a fine sawdust.

6. The method of claim 1 wherein the veneer is a thin wood veneer.

7. The method of claim 6 wherein the veneer is a hardwood.

8. The method of claim 1 wherein the veneer is a soft material or a cloth.

9. The method of claim 8 wherein the veneer is leather.

10. The method of claim 1 wherein the veneer is a metal foil.

11. A method for making a modular casket assembly, comprising the steps of:

a. providing a plurality of end panels and side panels, a bottom panel and a lid panel;

b. forming at least one of the panels by compressing a composite base material with a binder;

c. providing a veneer perforated with a plurality of pinholes;

d. applying a binder to at least a veneer surface or a panel surface;

e. applying the veneer to at least one of the panels;

f. causing steam to pass through the pinholes to activate the glue applied to a surface so as to cause the veneer to be secured to the panel;

g. following the step of securing the veneer to the panel, assembling the side panels, the end panels, and the bottom panel to form an open box; and h. attaching the lid panel to at least one of the side panels.

12. The method of claim 11 wherein the side panels and end panels are substantially flat.

13. The method of claim 11 wherein the side panels and end panels are substantially curvilinear.

14. The method of claim 11 wherein the binder comprises a hot melt glue.

15. The method of claim 11 wherein the base material comprises wood particles.

16. The method of claim 11 wherein the veneer is a thin wood veneer.

17. The method of claim 11 wherein the veneer is a hardwood.

18. The method of claim 11 wherein the veneer is a soft material.

19. The method of claim 18 wherein the veneer is a cloth or a leather.

20. A method for making a modular casket assembly, comprising the steps of:

a. providing a plurality of panels for assembly into a casket, wherein at least one of the panels is formed by the steps of (i) grinding a plurality of wooden scraps into a fine wooden composite grind so as to form a composite base material;

(ii) mixing the composite base material with a binder to form a mixture; and (iii) compressing the mixture into a molded panel;

b. providing a veneer perforated with a plurality of pinholes;

c. applying the veneer to the surfaces of the panels, wherein the step of applying includes causing steam to pass through the pinholes to activate a glue to secure the veneer to the composite panel;

d. assembling the panels into a casket box, wherein step c is performed before step d;

e. applying a finish coat to at least one of the panels.

* * * * *